Feb. 19, 1952   H. W. HAPMAN   2,586,538
FLIGHT CONVEYER STRUCTURE
Original Filed Dec. 13, 1944
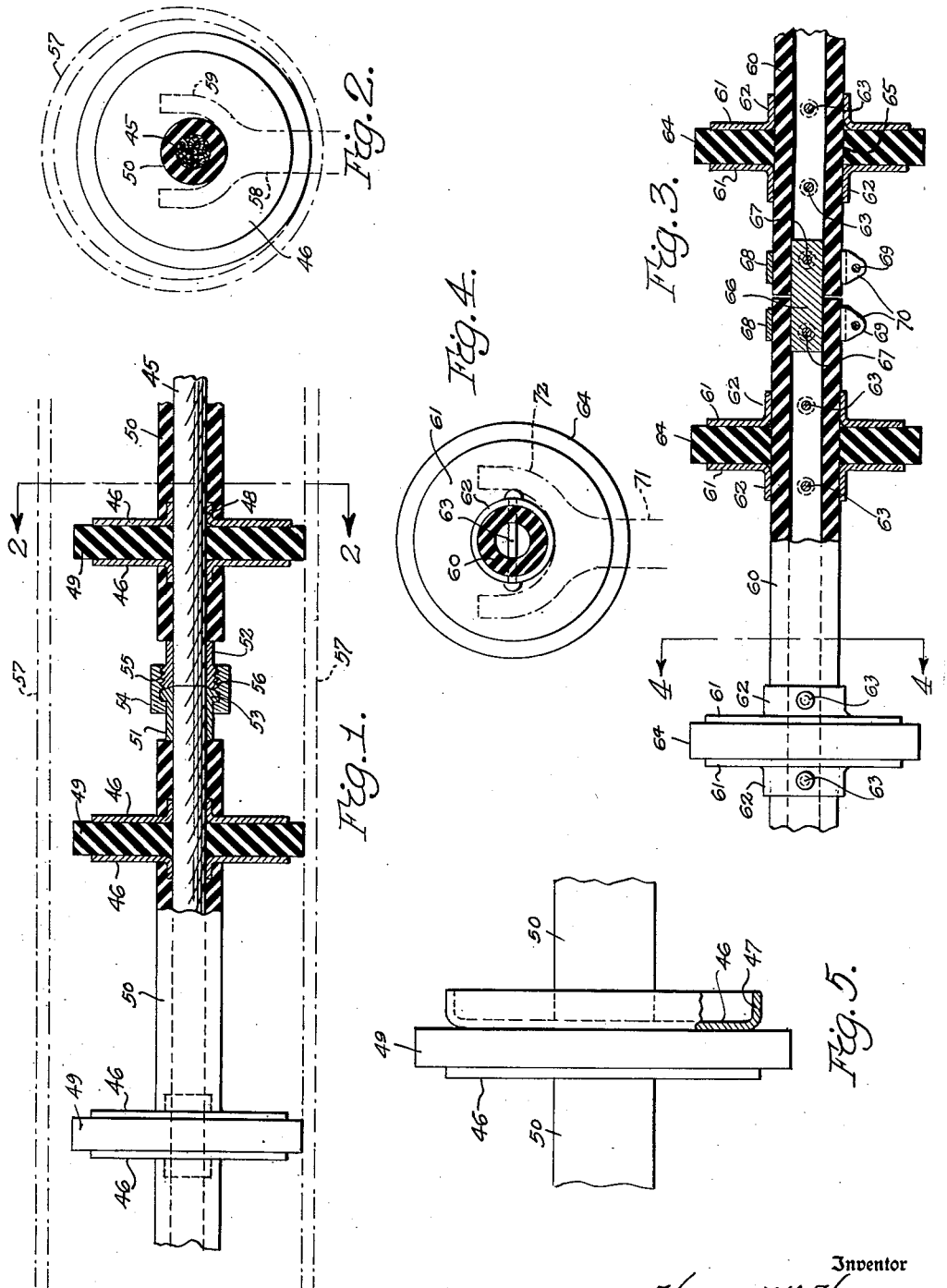
Inventor
Henry W. Hapman
Barthel + Bugbee
Attorneys Patented Feb. 19, 1952

2,586,538

UNITED STATES PATENT OFFICE 2,586,538

FLIGHT CONVEYER STRUCTURE

Henry W. Hapman, Detroit, Mich., assignor, by mesne assignments, of forty per cent to Hannah Jane Hapman, Detroit, Mich.

Original application December 13, 1944, Serial No. 567,961. Divided and this application October 28, 1948, Serial No. 57,048

4 Claims. (Cl. 198—176)

The present invention relates to improvements in conveyor structures and more particularly to a flexible conveyor element with conveyor flights thereon.

One object of the invention is to provide a flight conveyor having a flexible conveyor element with spaced flights thereon which are spaced by resilient tubular sleeve members extending between adjacent flights to protect the flexible conveyor element and increase the tensile strength thereof.

Another object of the invention is to provide a flight conveyor having a flexible conveyor element with spaced flights thereon, preferably of rubber-like material, and having a clamping plate on one or both sides thereof, with the flight projecting a slight distance beyond the edge. thereof so as to lend sufficient rigidity to the flight and yet prevent excessive wear on the conveyor conduit in which the conveyor is employed.

Another object is to provide a flight conveyor of the above-mentioned type in which the clamping plates have flanges extending along the flexible conveyor element.

Another object is to provide a flight conveyor of the above-mentioned type in which the resilient tubular sleeve members are adhesively secured to the flexible conveyor element as well as to the conveyor flights to assist in increasing the tensile strength of the flexible conveyor element and facilitate the handling of relatively heavy loads.

Another object is to provide a flight conveyor of the above-mentioned type wherein the flexible conveyor element consists of a flexible hollow tubular member preferably of rubber-like material and having spaced flights, also preferably of rubber-like material, mounted thereon at intervals therealong, each of the flights being optionally provided with a clamping plate on one or both sides thereof.

Another object is to provide a flight conveyor of the above-mentioned type wherein one of the clamping plates is cup-shaped so as to assist in cleaning out the conveyor conduit at the end of conveying operations after materials have ceased to be supplied to the conveyor conduit and the conveyor is operated for a short additional time for cleanout purposes.

This is a division of my co-pending application Serial No. 567,961, filed December 13, 1944, now Patent No. 2,555,338, granted June 5, 1951, for Conveyor Element Structure.

In the drawings:

Figure 1 is a side elevation of a flight conveyor according to one form of the invention, partly in longitudinal section;

Figure 2 is a cross-section along the line 2—2 in Figure 1;

Figure 3 is a side elevation, partly in longitudinal section, of a modified flight conveyor, wherein the flexible conveyor element consists of a hollow tube of rubber-like material;

Figure 4 is a cross-section along the line 4—4 in Figure 3; and

Figure 5 is a fragmentary side elevation of a further modified conveyor showing one of the flights equipped with a cup-shaped clamping plate for conduit cleanout purposes.

Referring to the drawings in detail, Figures 1 and 2 show one form of flight conveyor structure according to the invention wherein there is provided a single flexible conveyor propelling element in the form of a wire cable 45 adapted to have assembled thereon a series of conveyor flight clamping plates 46 having centrally-disposed annular flanges 48 surrounding suitable apertures in said conveyor flight plates 46 so as to be frictionally retained on the flexible wire cable 45. Also disposed on the flexible wire cable 45 is a series of natural or synthetic rubber disc flight elements 49 which are sandwiched between the conveyor flight plates 46 so that the peripheral portion thereof projects a slight distance beyond the peripheral edge of the conveyor flight plate 46. Tubular rubber spacing sleeves 50 are assembled on the wire cable 45 and disposed between adjacent conveyor flight plates 46 as shown in Figure 1 so that the ends of said tubular rubber sleeves or spacing elements 50 will overlie the annular flanges 48 of the conveyor flight plates 46 so that the tubular rubber sleeves may be adhesively secured to the flanges 48 and conveyor flight plates 46 by a rubber cement composition such as the cement described in the United States Patents Numbers 1,605,180, 1,617,588 and 1,744,880. The rubber spacing sleeves 50 are adhesively secured to the flexible wire cable 45 as well as the natural or synthetic rubber flight elements 49.

When the flight elements and tubular spacing sleeves 50 have thus been assembled on the wire cable 45, the ends thereof may be provided with tubular coupling members 51 and 52 so that the ends of said wire cables 45 may be welded or otherwise secured in place therein as shown clearly in Figure 1. An annular flange 53 is formed on the tubular coupling member 51 for retaining a coupling sleeve 54 thereon having internal screw threads 55 for receiving external screw-threads 56 formed on the enlarged head portion of the tubular coupling member 52. By simply threading the coupling sleeve 54 on the threads 56 of the tubular coupling sleeve 52, the ends of the cable 45 may be securely fastened together so that the endless flexible conveyor element may be mounted in a conveyor conduit or passageway as at 57 and propelled therein by means of a suitable drive sprocket 58. As shown in Figure 2, the drive sprocket 58 is provided with a series of circumferentially spaced forked portions 59 for receiving the wire cable 45 and tubular spacing sleeves 50 so that the forked portion 59 may drivingly engage one of the conveyor flight plates 46.

In the modified form of the invention shown in Figures 3 and 4, the flexible conveyor propelling element is composed of a tubular rubber member 60 which has an elongated void or hollow space running substantially the entire length of the central portion thereof. Upon the member 60 is threaded a series of conveyor plates 61 of disc-like formation having an annular flange 62 adapted to frictionally engage the tubular rubber conveyor element 60. The flanges 62 extend in opposite directions and are adapted to be fastened in place by transversely extending anchoring pins or bolts 63 which extend through suitable aligned apertures in the tubular rubber conveyor element 60 and flanges 62 of the conveyor flights 61. Interposed between the conveyor flight plates 61 is a conveyor flight 64 composed of natural or synthetic rubber with the edge thereof extending a slight distance beyond the peripheral edge of the conveyor flight plates 61 so as to engage the walls of the conveyor conduit or passageway in which the flexible conveyor element is used. The conveyor flights 64 are provided with central apertures 65 of substantially the same diameter as the tubular flexible conveyor element 60 so as to be slid thereon longitudinally and threaded on said flexible conveyor element in substantially the same manner as the conveyor flight plates 61. After all of the conveyor flights and conveyor flight plates 61 are assembled, they may be adhesively secured together by a rubber cement composition such as the cement previously described in connection with the forms of the invention shown in Figures 1 and 2.

In order to connect the ends of the tubular flexible conveyor element 60 to form an endless conveyor element, a round connecting block 66 is inserted in the ends thereof and said block is held in place by transversely extending anchoring pins 67 similar to the anchoring pin 63. The ends of the tubular flexible conveyor element 60 may be further fastened by means of clamping rings 68 which have their ends secured together by suitable clamping screws 69 passing through the lugs 70 of said clamping ring 68 and, if desired, the clamping ring 68 may extend over the ends of the transverse locking pin 67 so as to prevent lateral displacement thereof.

The endless conveyor element is adapted to be driven by means of a sprocket wheel 71 having a series of circumferentially spaced forked portions 72 for receiving the flexible endless conveyor element 60 so that the arms of the forked portions 72 will drivingly contact and engage the conveyor flights 61 as they traverse the radius of the sprocket 71. It is to be understood that the endless flexible conveyor element is adapted to operate in a conveyor conduit or pathway in substantially the same manner as pointed out in connection with the forms of the invention shown in Figures 1 to 2 inclusive.

As shown in Figure 5, one of the clamping plates 46 or 61 may be provided at its peripheral edge with a flange 47 which is adapted to form a cup-shaped member to facilitate the cleaning of the conveyor conduit or casing as the conveyor is operated in the absence of a load. In this manner, the tubular conveyor passageway may be completely emptied, after all the material has been conveyed, by running the conveyor a short length of time when the contents of the charging hopper has been completely charged to the conveyor and thereby emptied.

What I claim is:

1. A flight conveyor comprising an elongated hollow tubular flexible conveyor propelling element having a central longitudinal void extending substantially the entire length of said element, a series of conveyor flight supporting plates spacedly mounted on said conveyor propelling element, and flexible disc flights of rubber-like material secured to said supporting plates.

2. A flight conveyor comprising an elongated hollow tubular flexible conveyor propelling element having a central longitudinal void extending substantially the entire length of said element, a series of conveyor flight supporting plates spacedly mounted on said conveyor propelling element, and flexible disc flights of rubber-like material secured to said supporting plates, said flight supporting plates having axially-extending portions disposed adjacent said flexible conveyor element.

3. A flight conveyor comprising an elongated hollow tubular flexible conveyor propelling element having a central longitudinal void extending substantially the entire length of said element, a series of conveyor flight supporting plates spacedly mounted on said conveyor propelling element, and flexible disc flights of rubber-like material secured to said supporting plates, the said flight supporting plates having axially-extending annular flanges encircling the flexible conveyor element.

4. A flight conveyor comprising an elongated hollow tubular flexible conveyor propelling element having a central longitudinal void extending substantially the entire length of said element, a series of pairs of conveyor flight supporting plates spacedly mounted on said conveyor propelling element, and flexible disc flights of rubber-like material secured between adjacent pairs of said supporting plates.

HENRY W. HAPMAN.

REFERENCES CITED

The following references are of record in the file of this patent:

UNITED STATES PATENTS

| Number | Name | Date |
| --- | --- | --- |
| 1,953,245 | Mackenzie | Apr. 3, 1934 |
| 1,970,250 | Redler | Aug. 14, 1934 |
| 2,326,535 | Hapman | Aug. 10, 1943 |
| 2,429,549 | Hapman | Oct. 21, 1947 |